(12) United States Patent
Koenig et al.

(10) Patent No.: US 8,376,906 B2
(45) Date of Patent: Feb. 19, 2013

(54) AUTOMATIC TRANSMISSION FOR A HYBRID VEHICLE

(75) Inventors: Melissa Koenig, Howell, MI (US); Xiaoning Xiang, Troy, MI (US)

(73) Assignee: BorgWarner Inc., Auburn Hills, MI (US)

( * ) Notice: Subject to any disclaimer, the term of this patent is extended or adjusted under 35 U.S.C. 154(b) by 74 days.

(21) Appl. No.: 13/132,140

(22) PCT Filed: Dec. 4, 2009

(86) PCT No.: PCT/US2009/066674
§ 371 (c)(1), (2), (4) Date: Jun. 1, 2011

(87) PCT Pub. No.: WO2010/077560
PCT Pub. Date: Jul. 8, 2010

(65) Prior Publication Data
US 2011/0237388 A1    Sep. 29, 2011

Related U.S. Application Data

(60) Provisional application No. 61/120,887, filed on Dec. 9, 2008.

(51) Int. Cl.
*B60W 10/02* (2006.01)
*B60W 10/10* (2012.01)

(52) U.S. Cl. .................................................. 477/5

(58) Field of Classification Search ............. 477/5, 73, 477/156, 158
See application file for complete search history.

(56) References Cited

U.S. PATENT DOCUMENTS

| | | | |
|---|---|---|---|
| 1,233,561 A | 7/1917 | Dornfeld |
| 2,174,395 A | 9/1939 | Aikman |
| 2,639,013 A | 5/1953 | Meschia |
| 2,702,049 A | 2/1955 | Seeloff |
| 2,919,778 A | 1/1960 | Aschauer |
| 2,943,502 A | 7/1960 | Perkins et al. |
| 3,040,408 A | 6/1962 | Schou |
| 3,053,051 A | 9/1962 | Kelley |
| 3,171,522 A | 3/1965 | Petrie et al. |
| 3,313,385 A | 4/1967 | Förster |
| 3,362,481 A | 1/1968 | Steinhagen |
| 3,490,312 A | 1/1970 | Seitz et al. |
| 3,534,824 A | 10/1970 | Davison, Jr. |
| 3,537,556 A | 11/1970 | Pfeffer et al. |
| 3,589,483 A | 6/1971 | Smith |

(Continued)

FOREIGN PATENT DOCUMENTS

| | | |
|---|---|---|
| DE | 871857 | 7/1949 |
| DE | 953406 | 11/1956 |

(Continued)

OTHER PUBLICATIONS

Jul. 9, 2010 International Search Report for PCT/US2009/066674.

*Primary Examiner* — Edwin A Young
(74) *Attorney, Agent, or Firm* — Bliss McGlynn, P.C.

(57) ABSTRACT

An automatic transmission for a hybrid vehicle includes a hydraulic circuit (110) having a source of pressurized fluid (112), an actuation circuit (114) that delivers pressurized fluid to actuate components of the transmission, and a cooling circuit (116) used to cool components of the transmission. The source of pressurized fluid includes a first pump (134) that is operatively driven by the internal combustion engine of the hybrid vehicle and a second pump (136) that is operatively driven by the electric motor (138). The second pump (136) acts to supply pressurized fluid to the cooling circuit (116) when the first pump (134) is operatively driven by the internal combustion engine under certain predetermined conditions.

19 Claims, 2 Drawing Sheets

U.S. PATENT DOCUMENTS

| | | |
|---|---|---|
| 3,612,237 A | 10/1971 | Honda |
| 3,654,692 A | 4/1972 | Goetz |
| 3,760,918 A | 9/1973 | Wetrich et al. |
| 3,823,801 A | 7/1974 | Arnold |
| 3,834,503 A | 9/1974 | Maurer et al. |
| 3,858,698 A | 1/1975 | Hause |
| 4,023,444 A | 5/1977 | Murakami |
| 4,081,065 A | 3/1978 | Smyth et al. |
| 4,155,535 A | 5/1979 | Seamone |
| 4,205,739 A | 6/1980 | Shelby et al. |
| 4,219,246 A | 8/1980 | Ladin |
| 4,220,178 A | 9/1980 | Jackson |
| 4,270,647 A | 6/1981 | Leber |
| 4,295,792 A | 10/1981 | Tachibana et al. |
| 4,301,904 A | 11/1981 | Ahlen |
| 4,361,060 A | 11/1982 | Smyth |
| 4,372,434 A | 2/1983 | Aschauer |
| 4,445,393 A | 5/1984 | Braun |
| 4,449,416 A | 5/1984 | Huitema |
| 4,458,318 A | 7/1984 | Smit et al. |
| 4,461,188 A | 7/1984 | Fisher |
| 4,476,748 A | 10/1984 | Morscheck |
| 4,501,676 A | 2/1985 | Moorhouse |
| 4,513,631 A | 4/1985 | Koivunen |
| 4,540,078 A | 9/1985 | Wetrich |
| 4,540,347 A | 9/1985 | Child |
| 4,544,057 A | 10/1985 | Webster et al. |
| 4,548,306 A | 10/1985 | Hartz |
| 4,557,363 A | 12/1985 | Golan |
| 4,622,866 A | 11/1986 | Ito et al. |
| 4,627,312 A | 12/1986 | Fujieda et al. |
| 4,646,891 A | 3/1987 | Braun |
| 4,653,348 A | 3/1987 | Hiraiwa |
| 4,662,249 A | 5/1987 | Miki et al. |
| 4,667,534 A | 5/1987 | Kataoka |
| 4,667,798 A | 5/1987 | Sailer et al. |
| 4,680,987 A | 7/1987 | Morimoto |
| 4,700,823 A | 10/1987 | Winckler |
| 4,713,980 A | 12/1987 | Ida et al. |
| 4,719,998 A | 1/1988 | Hiramatsu et al. |
| 4,722,237 A | 2/1988 | McNinch, Jr. |
| 4,732,253 A | 3/1988 | Hiramatsu et al. |
| 4,747,744 A | 5/1988 | Dominique et al. |
| 4,753,332 A | 6/1988 | Bieber et al. |
| 4,766,774 A | 8/1988 | Tamai |
| 4,790,418 A | 12/1988 | Brown et al. |
| 4,802,564 A | 2/1989 | Stodt |
| 4,808,015 A | 2/1989 | Babcock |
| 4,827,784 A | 5/1989 | Muller et al. |
| 4,841,803 A | 6/1989 | Hamano et al. |
| 4,905,801 A | 3/1990 | Tezuka |
| 4,911,031 A | 3/1990 | Yoshimura et al. |
| 4,941,508 A | 7/1990 | Hennessy et al. |
| 4,947,970 A | 8/1990 | Miller et al. |
| 4,957,016 A | 9/1990 | Amedei et al. |
| 4,976,594 A | 12/1990 | Bernstrom |
| 5,050,714 A | 9/1991 | Kurihara et al. |
| 5,069,656 A | 12/1991 | Sherman |
| 5,152,726 A | 10/1992 | Lederman |
| 5,174,420 A | 12/1992 | DeWald et al. |
| 5,232,411 A | 8/1993 | Hayashi et al. |
| 5,250,011 A | 10/1993 | Pierce |
| 5,259,476 A | 11/1993 | Matsuno et al. |
| 5,261,803 A | 11/1993 | Freeman |
| 5,275,267 A | 1/1994 | Slicker |
| 5,282,722 A | 2/1994 | Beatty |
| 5,284,232 A | 2/1994 | Prud'Homme |
| 5,299,920 A | 4/1994 | Stearns |
| 5,305,863 A | 4/1994 | Gooch et al. |
| 5,383,544 A | 1/1995 | Patel |
| 5,395,217 A | 3/1995 | Hoffmann et al. |
| 5,413,470 A | 5/1995 | Eisenmann |
| 5,439,088 A | 8/1995 | Michioka et al. |
| 5,444,623 A | 8/1995 | Genise |
| 5,445,043 A | 8/1995 | Eaton et al. |
| 5,450,934 A | 9/1995 | Maucher |
| 5,469,943 A | 11/1995 | Hill et al. |
| 5,474,428 A | 12/1995 | Kimura et al. |
| 5,476,374 A | 12/1995 | Langreck |
| 5,495,927 A | 3/1996 | Samie et al. |
| 5,499,704 A | 3/1996 | Hays |
| 5,505,286 A | 4/1996 | Nash |
| 5,522,775 A | 6/1996 | Maruyama et al. |
| 5,538,121 A | 7/1996 | Hering |
| 5,554,019 A | 9/1996 | Hodge |
| 5,577,588 A | 11/1996 | Raszkowski |
| 5,584,776 A | 12/1996 | Weilant et al. |
| 5,609,067 A | 3/1997 | Mitchell et al. |
| 5,613,588 A | 3/1997 | Vu |
| 5,630,773 A | 5/1997 | Slicker et al. |
| 5,634,541 A | 6/1997 | Maucher |
| 5,634,867 A | 6/1997 | Mack |
| 5,662,198 A | 9/1997 | Kojima et al. |
| 5,679,098 A | 10/1997 | Shepherd et al. |
| 5,711,409 A | 1/1998 | Murata |
| 5,720,203 A | 2/1998 | Honda et al. |
| 5,732,736 A | 3/1998 | Ollivier |
| 5,755,314 A | 5/1998 | Kanda et al. |
| 5,782,710 A | 7/1998 | Kosik et al. |
| 5,806,643 A | 9/1998 | Fitz |
| 5,823,909 A | 10/1998 | Beim et al. |
| 5,830,102 A | 11/1998 | Coffey |
| 5,851,164 A | 12/1998 | Habuchi et al. |
| 5,890,392 A | 4/1999 | Ludanek et al. |
| 5,899,310 A | 5/1999 | Mizuta |
| 5,908,100 A | 6/1999 | Szadkowski et al. |
| 5,915,512 A | 6/1999 | Adamis et al. |
| 5,918,715 A | 7/1999 | Ruth et al. |
| 5,928,104 A | 7/1999 | Kimura et al. |
| 5,944,042 A | 8/1999 | Takahashi et al. |
| 5,950,781 A | 9/1999 | Adamis et al. |
| 5,964,675 A | 10/1999 | Shimada et al. |
| 5,966,989 A | 10/1999 | Reed, Jr. et al. |
| 5,979,257 A | 11/1999 | Lawrie |
| 6,000,510 A | 12/1999 | Kirkwood et al. |
| 6,006,620 A | 12/1999 | Lawrie et al. |
| 6,012,561 A | 1/2000 | Reed, Jr. et al. |
| 6,026,944 A | 2/2000 | Satou et al. |
| 6,044,719 A | 4/2000 | Reed, Jr. et al. |
| 6,059,534 A | 5/2000 | Kotake et al. |
| 6,062,361 A | 5/2000 | Showalter |
| 6,065,363 A | 5/2000 | Schaller et al. |
| 6,071,211 A | 6/2000 | Liu et al. |
| 6,095,941 A | 8/2000 | Martin et al. |
| 6,105,448 A | 8/2000 | Borschert et al. |
| 6,109,410 A | 8/2000 | Costin |
| 6,116,397 A | 9/2000 | Kosumi et al. |
| 6,135,919 A | 10/2000 | Shimakura |
| 6,145,398 A | 11/2000 | Bansbach et al. |
| 6,164,149 A | 12/2000 | Ohmori et al. |
| 6,171,212 B1 | 1/2001 | Reuschel |
| 6,186,299 B1 | 2/2001 | Ruth |
| 6,189,669 B1 | 2/2001 | Kremer et al. |
| 6,210,300 B1 | 4/2001 | Costin et al. |
| 6,217,479 B1 | 4/2001 | Brown et al. |
| 6,227,063 B1 | 5/2001 | Ohmori et al. |
| 6,244,407 B1 | 6/2001 | Kremer et al. |
| 6,269,293 B1 | 7/2001 | Correa et al. |
| 6,276,224 B1 | 8/2001 | Ueda et al. |
| 6,286,381 B1 | 9/2001 | Reed, Jr. et al. |
| 6,295,884 B1 | 10/2001 | Miyake et al. |
| 6,299,565 B1 | 10/2001 | Jain et al. |
| 6,321,612 B1 | 11/2001 | Leimbach et al. |
| 6,334,371 B1 | 1/2002 | Stengel et al. |
| 6,349,608 B1 | 2/2002 | Lenzi |
| 6,364,809 B1 | 4/2002 | Cherry |
| 6,378,302 B1 | 4/2002 | Nozawa et al. |
| 6,389,916 B1 | 5/2002 | Fukuda |
| 6,393,943 B1 | 5/2002 | Sommer et al. |
| 6,415,213 B1 | 7/2002 | Hubbard et al. |
| 6,419,062 B1 | 7/2002 | Crowe |
| 6,427,550 B1 | 8/2002 | Bowen |
| 6,435,049 B1 | 8/2002 | Janasek et al. |
| 6,435,213 B2 | 8/2002 | Lou |
| 6,438,952 B1 | 8/2002 | Nozawa et al. |
| 6,463,821 B1 | 10/2002 | Reed, Jr. et al. |
| 6,470,764 B1 | 10/2002 | Yamaguchi et al. |

| | | |
|---|---|---|
| 6,490,944 B1 | 12/2002 | Heinzel et al. |
| 6,523,657 B1 | 2/2003 | Kundermann et al. |
| 6,527,074 B1 | 3/2003 | Morishita |
| 6,536,296 B2 | 3/2003 | Sakamoto et al. |
| 6,602,161 B2 | 8/2003 | Hemmingsen et al. |
| 6,615,966 B2 | 9/2003 | Kato |
| 6,619,152 B2 | 9/2003 | Ochi et al. |
| 6,626,056 B2 | 9/2003 | Ulm et al. |
| 6,631,651 B2 | 10/2003 | Petrzik |
| 6,638,197 B2 | 10/2003 | Ogawa et al. |
| 6,656,090 B2 | 12/2003 | Matsumura et al. |
| 6,669,596 B1 | 12/2003 | Sefcik |
| 6,685,437 B2 | 2/2004 | Koenig et al. |
| 6,695,748 B2 | 2/2004 | Kopec et al. |
| 6,715,597 B1 | 4/2004 | Buchanan et al. |
| 6,736,751 B1 | 5/2004 | Usoro et al. |
| 6,752,743 B2 | 6/2004 | Eich et al. |
| 6,789,658 B2 | 9/2004 | Busold et al. |
| 6,790,159 B1 | 9/2004 | Buchanan et al. |
| 6,792,821 B1 | 9/2004 | Yamamoto |
| 6,819,997 B2 | 11/2004 | Buchanan et al. |
| 6,830,531 B1 | 12/2004 | Koenig et al. |
| 6,832,978 B2 | 12/2004 | Buchanan et al. |
| 6,834,562 B2 | 12/2004 | Esly et al. |
| 6,868,949 B2 | 3/2005 | Braford, Jr. |
| 6,869,382 B2 | 3/2005 | Leising et al. |
| 6,883,394 B2 | 4/2005 | Koenig et al. |
| 6,887,184 B2 | 5/2005 | Buchanan et al. |
| 6,898,992 B2 | 5/2005 | Koenig et al. |
| 6,909,955 B2 | 6/2005 | Vukovich et al. |
| 6,953,417 B2 | 10/2005 | Koenig |
| 6,957,665 B2 | 10/2005 | Shin et al. |
| 7,073,407 B2 | 7/2006 | Stefina |
| 7,127,961 B2 | 10/2006 | Braford et al. |
| 7,155,993 B2 | 1/2007 | Koenig et al. |
| 7,219,571 B2 | 5/2007 | McCrary |
| 7,311,187 B2 | 12/2007 | Koenig et al. |
| 7,318,512 B2 | 1/2008 | Bauer et al. |
| 7,431,043 B2 | 10/2008 | Xiang et al. |
| 7,856,999 B2 | 12/2010 | Xiang et al. |
| 2001/0037698 A1 | 11/2001 | Yamamoto et al. |
| 2002/0014386 A1 | 2/2002 | Diemer et al. |
| 2002/0082131 A1 | 6/2002 | Park et al. |
| 2002/0185351 A1 | 12/2002 | Berger et al. |
| 2003/0057051 A1 | 3/2003 | Alfredsson |
| 2003/0075413 A1 | 4/2003 | Alfredsson |
| 2003/0178275 A1 | 9/2003 | Breier et al. |
| 2004/0060378 A1 | 4/2004 | Yamamoto et al. |
| 2004/0060793 A1 | 4/2004 | Dacho et al. |
| 2004/0138025 A1 | 7/2004 | Yamaguchi et al. |
| 2004/0206599 A1 | 10/2004 | Hegerath |
| 2005/0000774 A1 | 1/2005 | Friedmann |
| 2005/0067251 A1 | 3/2005 | Braford, Jr. et al. |
| 2005/0279605 A1 | 12/2005 | Sowul et al. |
| 2006/0005647 A1 | 1/2006 | Braford et al. |
| 2006/0006042 A1 | 1/2006 | Koenig |
| 2006/0006043 A1 | 1/2006 | Koenig et al. |
| 2006/0009326 A1 | 1/2006 | Stefina |
| 2006/0174624 A1 | 8/2006 | Grabowski et al. |
| 2007/0240919 A1 | 10/2007 | Carlson |
| 2007/0284213 A1 | 12/2007 | Duhaime et al. |
| 2009/0036264 A1* | 2/2009 | Tozawa et al. .................... 477/5 |
| 2009/0232673 A1 | 9/2009 | Reisch et al. |

FOREIGN PATENT DOCUMENTS

| | | |
|---|---|---|
| DE | 1146314 | 3/1963 |
| DE | 1217800 | 5/1966 |
| DE | 3149880 C2 | 7/1982 |
| DE | 3118565 A1 | 11/1982 |
| DE | 3532759 C1 | 3/1987 |
| DE | 19700635 C2 | 8/1997 |
| DE | 19631983 C1 | 2/1998 |
| DE | 10012122 A1 | 9/2000 |
| DE | 10034677 A1 | 2/2002 |
| DE | 10049474 A1 | 4/2002 |
| DE | 10118756 A1 | 5/2002 |
| DE | 10115454 A1 | 8/2002 |
| DE | 10156789 A1 | 8/2002 |
| DE | 10125172 A1 | 11/2002 |
| DE | 10143834 A1 | 3/2003 |
| EP | 0120617 A1 | 10/1984 |
| EP | 0762009 A1 | 3/1997 |
| EP | 0848179 A1 | 6/1998 |
| EP | 1195537 A1 | 4/2002 |
| EP | 1420185 A2 | 11/2003 |
| EP | 1531292 A2 | 11/2004 |
| EP | 1703178 A2 | 9/2006 |
| EP | 1788288 A2 | 5/2007 |
| EP | 1950076 A1 | 7/2008 |
| FR | 1246517 | 10/1960 |
| FR | 2123828 | 8/1972 |
| GB | 2036203 A | 6/1980 |
| GB | 2356438 A | 5/2001 |
| JP | 4366032 | 12/1992 |
| JP | 8200393 | 8/1996 |
| JP | 2001206108 A | 7/2001 |
| JP | 2005147403 | 6/2005 |
| WO | 2004005744 A1 | 1/2004 |
| WO | 2006086704 A2 | 8/2006 |
| WO | 2009128806 A1 | 10/2009 |

* cited by examiner

AUTOMATIC TRANSMISSION FOR A HYBRID VEHICLE

BACKGROUND OF THE INVENTION

1. Field of the Invention

The present invention relates, generally, to an automatic transmission and, more specifically, to an automatic transmission designed for use with a hybrid vehicle.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle.

Hybrid vehicles employ two separate power plants. One power plant is typically an internal combustion engine. The other is an electric motor. The electric motor is powered by electrical energy stored in a bank of batteries that are typically also supported on the vehicle. The batteries may be recharged by the internal combustion engine via an electrical generator that is driven by the internal combustion engine or from another external power source.

Controlling and regulating transmissions to achieve the desired vehicle occupant comfort goals in an efficient and cost effective manner is a complicated matter. There are a large number of events to properly time and execute within the transmission for each shift to occur smoothly and efficiently. Furthermore, since the control of automatic transmissions is carried out by hydraulically actuating the various components within the transmission, it is important to provide a stable hydraulic pressure. Since hydraulically actuated devices respond in a predetermined and a precise manner for the given pressure supplied to actuate them, inaccurate control of the hydraulic pressure causes inaccurate operation and control of the transmission. Establishing and maintaining a stable hydraulic pressure in an automatic transmission can be problematic. As previously mentioned, a pump is employed to provide pressurized hydraulic fluid for the control and actuation of the transmission. In addition, the clutches and gear assemblies are lubricated and cooled by a secondary flow of hydraulic fluid. With conventional vehicles, the pump is mechanically driven by a power take-off from the engine. Thus, the hydraulic pressure delivered from the pump increases as the pump speed increases in response to an increase in engine speed.

The challenges of maintaining hydraulic pressure delivered from the pump in a conventional vehicle are only complicated in a hybrid vehicle. In a hybrid vehicle, the electric motor is operable when the vehicle is driven short distances at slower speeds, such as in stop-and-go traffic and city driving. However, even when the electric motor drives the vehicle, the clutches, as well as other components of the transmission, still need to have access to pressurized transmission fluid. Accordingly, it is known to employ a separate pump that is driven by the electric motor to ensure that the transmission has sufficient access to pressurized fluid when the electric motor is operable. Thus, transmissions used for hybrid vehicles typically employ two separate pumps that act independently of one another to provide pressurized fluid to the transmission under all operating conditions. This essentially requires two redundant pumps of similar size and capacity that operate alternatively depending on whether the internal combustion or the electric motor is driving the vehicle. This arrangement results in increased costs and complexity as the transmission must be configured to receive hydraulic fluid from two separate sources depending on which portion of the hybrid's power plant is operational. In addition, there is a certain inefficiency in having two pumps that serve the same purpose but are alternatingly operable depending on the source of motive power used to drive the hybrid engine.

One type of transmission known in the art has two clutches and is generally referred to simply as dual, or twin, clutch transmissions (DCTs). The dual clutch structure is most often coaxially and cooperatively configured to derive power input from a flywheel arrangement. However, some designs have a dual clutch assembly that is coaxial, but with the clutches located on opposite sides of the transmissions body and having different input sources. Regardless, dual clutch transmissions typically include one power transmission assembly on each of two input shafts concomitantly driving one output shaft. Each clutch and associated gear sets can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain dual clutch transmissions. These factors make the dual clutch transmissions an attractive component for a hybrid engine.

While the automatic transmissions known in the related art have generally worked for their intended purposes, there remains a need in the art for a transmission for a hybrid engine having improved operational interaction between the power plants of a hybrid engine and the transmission. In addition, there remains a need in the art for such a transmission used in connection with hybrid engines that are less complex and costly to manufacture than current systems available in the market. At the same time, there remains a need in the art for a transmission designed for use with a hybrid engine that is capable of quickly and efficiently providing pressurized hydraulic fluid for the control and actuation of the transmission as well as for cooling the various components of the transmission in a cost-effective manner.

SUMMARY OF THE INVENTION

The deficiencies of the related art are overcome in an automatic transmission for a hybrid vehicle of the present invention wherein the vehicle has a power plant including an internal combustion engine and an electric motor. The transmission includes a hydraulic circuit having a source of pressurized fluid and further including an actuation circuit that delivers pressurized fluid used to actuate components of the transmission as well as a cooling circuit that delivers pressurized fluid used to cool components of the transmission. The source of pressurized fluid includes a first pump that is operatively driven by the internal combustion engine of the hybrid vehicle and a second pump that is operatively driven by the electric motor. A pair of check valves is disposed in series and in fluid communication with the second pump. The first pump is operable to supply pressurized fluid to the actuator circuit and the cooling circuit when the vehicle is operatively driven by the internal combustion engine. The second pump acts to supply pressurized fluid to the cooling circuit when the first pump is operatively driven by the internal combustion engine under certain predetermined conditions and the first check valve is open. In addition, the second pump also acts to supply pressurized fluid to the actuation circuit and the cooling circuit when the internal combustion engine is no longer operatively driving the first pump and the first and second check valves are open.

In this way, and under certain predetermined conditions, both the first and second pumps are operable to supply pressurized fluid to the hydraulic circuit when necessary. This may occur, for example, when the pressure delivered to the cooling circuit drops below a predetermined value. In this case, the second pump driven by the electric motor assists the first pump to provide cooling fluid to the cooling circuit when the first check valve is open. This arrangement allows the use of a smaller capacity, mechanically driven first pump and thereby reduces the cost of the transmission.

BRIEF DESCRIPTION OF THE DRAWINGS

Other objects, features and advantages of the present invention will be readily appreciated, as the same becomes better understood after reading the subsequent description taken in connection with the accompanying drawings wherein.

DETAILED DESCRIPTION

Figure 1:
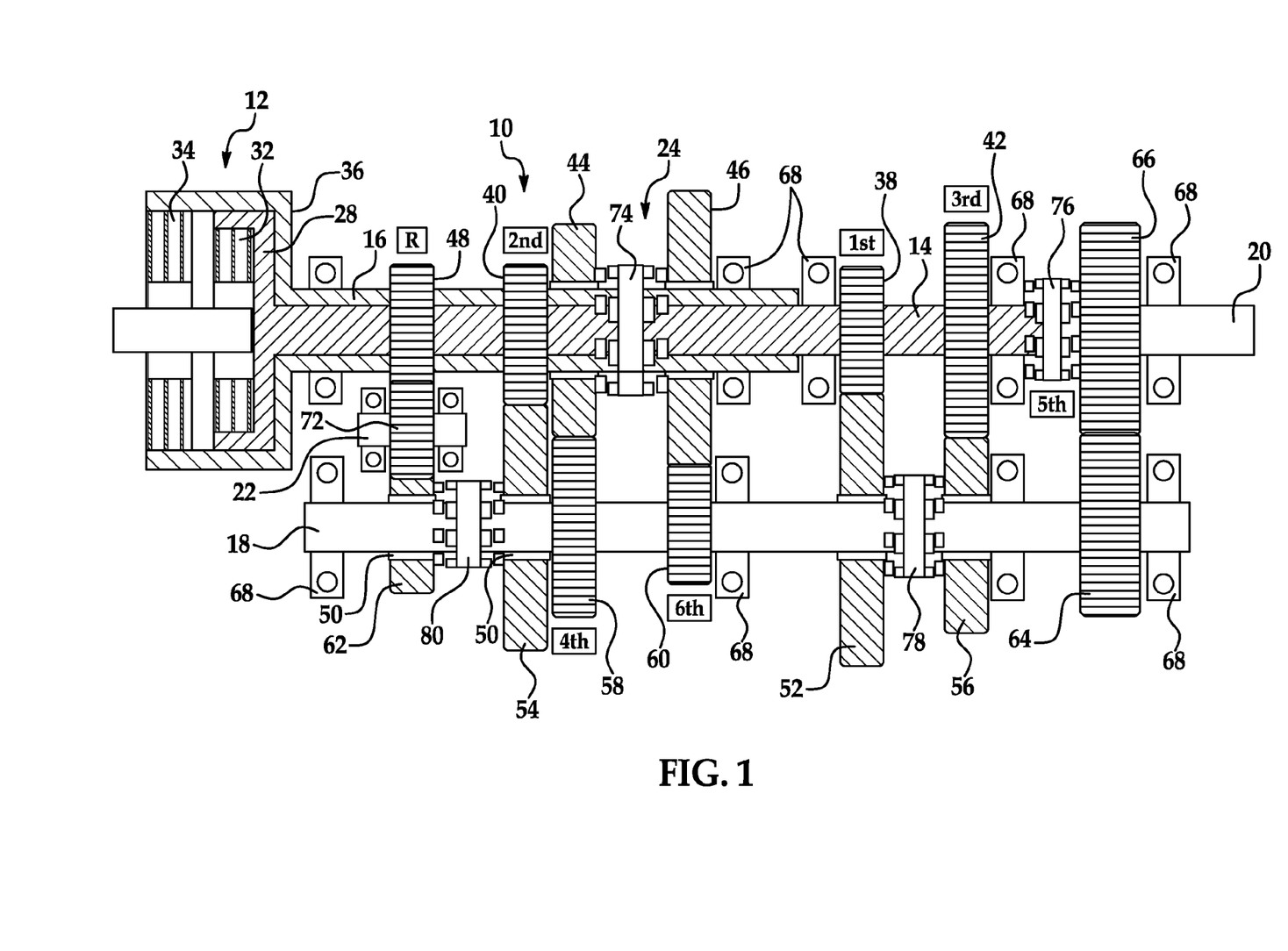
FIG. 1 is a schematic illustration of a representative example of a transmission of the type that may employ the hydraulic valves of the present invention.

A representative example of an automatic transmission that may be employed for a hybrid engine is generally indicated at 10 in FIG. 1. In this case, the automatic transmission described and illustrated herein is a dual clutch transmission. However, those having ordinary skill in the art will appreciate from the description that follows that the present invention may be employed in connection with any type of automatic transmission used for a hybrid engine. Thus, those having ordinary skill in the art will understand that the present invention is defined by the claims set forth herein, rather than by the dual clutch transmission illustrated in FIG. 1 and described below. As illustrated in FIG. 1, the dual clutch transmission 10 may include a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, a plurality of synchronizers, generally indicated at 24.

The dual clutch transmission 10 forms a portion of a vehicle powertrain and is responsible for taking a torque input from the hybrid power plant, such as an internal combustion engine or electrical motor, and transmitting the torque through selectable gear ratios to the vehicle drive wheels. The dual clutch transmission 10 operatively routes the applied torque from the power plant through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacts with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators 26 (FIG. 2) to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of a flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As shown in one embodiment illustrated in FIG. 1, the first and second clutch mechanisms 32, 34 are coaxial such that the outer case 28 of the first clutch mechanism 32 fits inside of the outer case 36 of the second clutch mechanism 34. Similarly, the first and second input shafts 14, 16 are also coaxial such that the second input shaft 16 is hollow having an inside diameter sufficient to allow the first input shaft 14 to pass through and be partially supported by the second input shaft 16. Notwithstanding the embodiment illustrated in FIG. 1, those having ordinary skill in the art will appreciate that the first and second clutch mechanisms 32, 34 may be physically arranged concentrically within the transmission, rather than the parallel structure illustrated in FIG. 1. Similarly, the first and second input shafts may be arranged in parallel relative to one another.

The first input shaft 14 includes a first input gear 38 and a third input gear 42. The first input shaft 14 is longer in length than the second input shaft 16 so that the first input gear 38 and a third input gear 42 are disposed adjacent to each other on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly supported on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

The counter shaft 18 includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and sixth counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly mounted on the output shaft 20. The output shaft 20 extends outward from the transmission 10 to provide an attachment for the remainder of the powertrain.

The reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gears 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that there are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its respective shaft when moved off of a center neutralized position to the right and engage another gear to its respective shaft when moved to the left. Specifically with reference to the example illustrated in FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76. It should be appreciated that this example of the dual clutch transmission is representative and that other gear set, synchronizer, and shift actuator arrangements are possible for the dual clutch transmission 10 without departing from the scope of the present invention.

It should be further appreciated that the operation of the dual clutch transmission 10 is managed by some type of control device such as an electronic control unit (ECU) that oversees the functioning of the transmission 10, or by an electronic control unit for the vehicle in which the dual clutch transmission 10 may be installed. In any event, there exists a control device, beyond the scope of this invention, that controls and operates the dual clutch transmission through a stored control scheme or series of control schemes of which the present invention is merely a part. The control device having the capability of providing the proper voltages, signals, and/or hydraulic pressures to operate the transmission 10 and particularly the clutch engagement functions.

The first and second clutch mechanisms 32 and 34 of the dual clutch assembly 12 are operatively engaged and disengaged in a coordinated manner relative to the actuator of the various gear sets by the synchronizer 24 to selectively transfer torque to the output shaft 20. By way of example, if torque is being transferred to the drive wheels of the vehicle to initiate movement from a standing start, the lowest, or first, gear ratio of the dual clutch transmission 10 will likely be engaged. Therefore, as shown in FIG. 1, synchronizer 78 will be driven to the left to engage the first counter gear 52 to the counter shaft 18 and the first clutch mechanism 32 will be engaged to transfer torque from the engine to the output shaft 20 through the first gear set. When vehicle speed increases and the ECU determines that the conditions require a shift to the second gear set, synchronizer 80 will first be driven to the right to engage the second counter gear 54 to the counter shaft 18. Then the second clutch mechanism 34 will be engaged as the first clutch mechanism 32 is disengaged. In this manner, a powershift, where no power interruption occurs, is affected. This powershift changeover of the clutches 32 and 34 occurs for each shift change of the dual clutch transmission 10. As the inactive clutch (now the on-coming clutch) is engaged, the load applied causes a surge of power to be transferred across the clutch with an accompanying generation of heat from the slip that occurs across the clutch. The temperature of the on-coming clutch rapidly increases, or spikes, to a point where the clutch plates or the friction material could be damaged if proper cooling is not provided. Additionally, the heat build-up, if not properly dissipated, will greatly increase the overall temperature of the dual clutch transmission 10 and may cause the damaging effects mentioned above. Simultaneously, while the temperature of the on-coming clutch is sharply rising, the disengaging, or off-going, clutch will cease transmitting torque. With the removal of the load, the disengaged clutch will stop generating heat, thus sharply lowering its cooling requirement.

Figure 2:
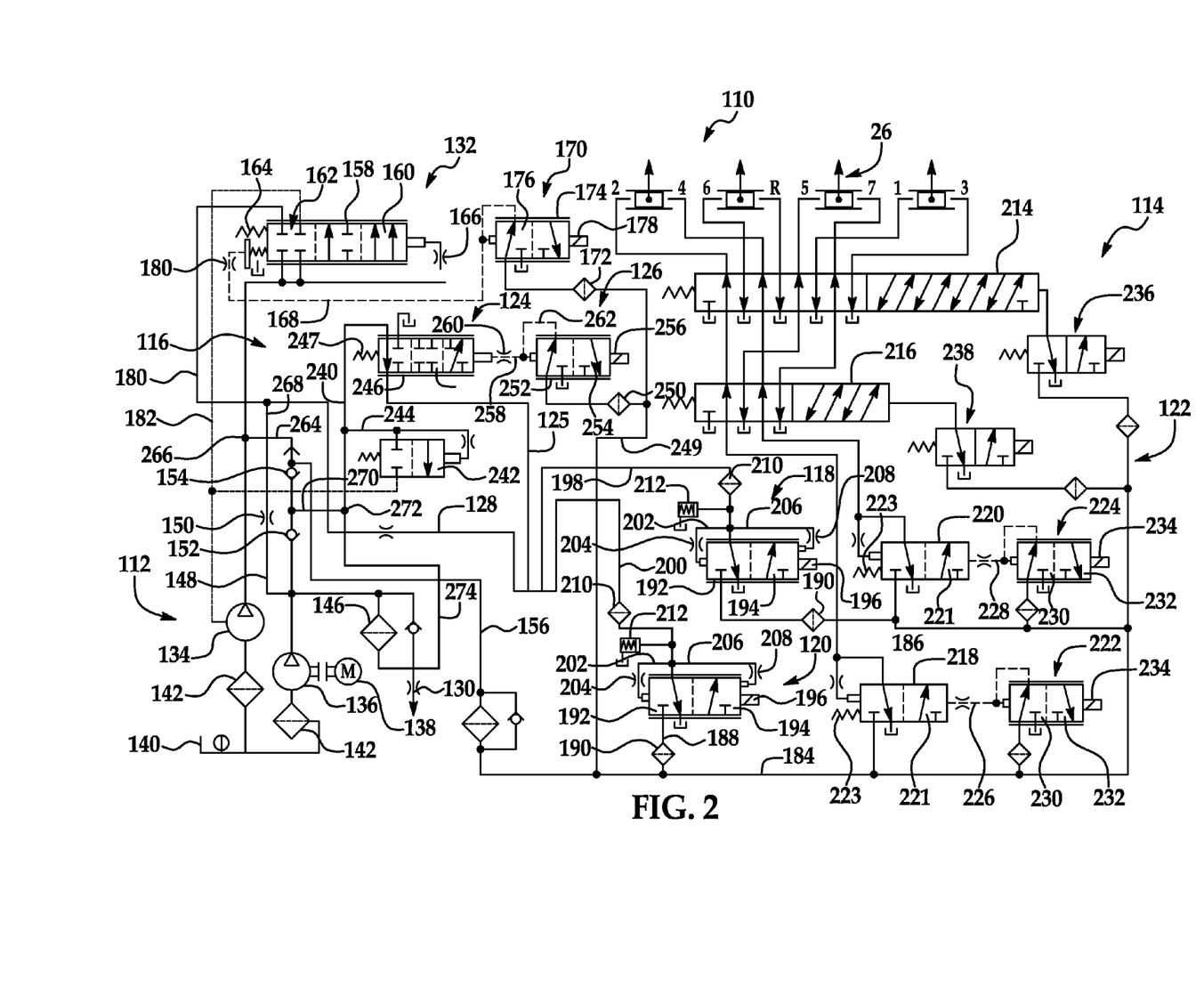
FIG. 2 is a schematic diagram of a representative hydraulic circuit for a dual clutch transmission.

A hydraulic circuit for controlling and cooling the clutches 32, 34 of the dual clutch transmission is generally indicated at 110 in FIG. 2, where like numerals are used to designate like components throughout the figures. The hydraulic circuit 110 includes a source of pressurized cooling, generally indicated at 112. In addition, the hydraulic circuit 110 includes an actuation circuit, generally indicated at 114, that delivers pressurized fluid used to actuate components of the dual clutch transmission, such as the clutches 32, 34 as well as similar components. Moreover, the hydraulic circuit 110 also includes a cooling circuit, generally indicated at 116, that delivers pressurized fluid used to lubricate and cool components of the dual clutch transmission such as the clutches 32, 34 and the gears described above.

The actuation circuit 114 includes first and second clutch actuation valves, generally indicated at 118, 120 that are similarly in fluid communication with the source of pressurized cooling fluid 112. Each of the first and second clutch actuation valves 118, 120 correspond to one of the two clutches 32, 34 of the dual clutch transmission and are adapted to provide pressurized fluid to each of the corresponding ones of the clutches 32, 34 of the dual clutch transmission to actuate the clutches. The actuator circuit 114 also includes a shift actuation system, generally indicated at 122, that is in fluid communication with the source of pressurized fluid 112 and acts to selectively provide fluid power to the shift actuators 26 so as to actuate the synchronizers 24 and select a designated gear among the plurality of gears.

The cooling circuit 116 includes a lube valve, generally indicated at 124, that is similarly disposed in fluid communication with the source of pressurized fluid 112 and acts to provide fluid for purposes of lubricating and cooling each of the clutches of the dual clutch transmission via clutch lube line 125. A lube control actuator, generally indicated at 126 is in fluid communication with the lube valve 124 and is adapted to selectively control the lube valve, as will be described in greater detail below. The cooling circuit 116 also includes a clutch support lube delivery line 128 that is in fluid communication with the source of pressurized fluid 112 and is adapted to provide pressurized cooling fluid to the clutches 32, 34 of the dual clutch transmission. The clutch support lube delivery line 128 is employed to provide pressurized fluid to bearings and other inner workings of the clutches to keep them cool. In addition, the cooling circuit 116 includes a gear lube delivery line 130 that is in fluid communication with the source of pressurized fluid 112 and acts to provide pressurized cooling fluid to the gears of the dual clutch transmission. Each of these components of the hydraulic circuit 110 illustrated in FIG. 2 will be described in greater detail below.

A main pressure regulator, generally indicated at 132, is disposed in fluid communication with the source of pressurized fluid 112 and adapted to provide a predetermined set system pressure for the hydraulic circuit 110. The source of pressurized fluid 112 includes a first pump 134 that is operatively driven by the internal combustion engine of the hybrid vehicle. In addition, the source of pressurized fluid 112 also includes a second pump 136 that is operatively driven by the electric motor 138. Each of the first and second pumps 134, 136 draws cooling fluid from a sump 140 through a filter 142 and supplies the pressurized cooling fluid through a main pressure line 144 to the main pressure regulator 132. A cooling unit 146 is in fluid communication with the source of pressurized fluid through line 148 and is adapted to exchange heat from the cooling fluid with other media. The heated cooling fluid flows past a restrictor 150 through the cooling unit 146 and is then distributed throughout the cooling circuit 116. A pair of check valves 152, 154 is disposed in series and in fluid communication with the second pump 136. The first pump 134 operates to supply pressurized fluid to the actuator circuit 114 and the cooling circuit 116 when the first pump 134 is operatively driven by the internal combustion engine. The second pump 136 acts to supply pressurized fluid to the cooling circuit 116 when the first pump 134 is operatively driven by the internal combustion engine under certain predetermined conditions as will be explained in greater detail below and the first check valve is open. In addition, the second pump also acts to supply pressurized fluid to both the actuation circuit 114 and the cooling circuit 116 when the internal combustion engine is no longer operatively driving the first pump 134 and the first and second check valves 152, 154 are open. The interaction of the first and second pumps 134, 136 as well as the check valves 152, 154 with the internal combustion engine and electric motor 138 of the hybrid engine will be described in greater detail below.

The main pressure regulator 132 maintains the pressure in the regulated line 156 at a predetermined operating pressure, or set point as will be described in greater detail below. The main pressure regulator 132 is schematically shown in FIG. 2 in its closed position and includes a valve body 158 with a valve member 160 movably supported within the valve body 158. The main pressure regulator 132 also includes internal flow passages, generally indicated at 162 and a biasing member 164 which acts on the valve member 160 to bias it to the right as illustrated in this figure. Pressure in the main pressure line 144 is supplied to the right side of the main regulator valve 132 through a flow restrictor 166 that reduces the flow volume but maintains the applied pressure. Fluid pressure is delivered to the right side of the main pressure regulator 132 and overcomes the spring force of the biasing member 164 and moves the valve member 160 of the main pressure regulator 132 to the left from the closed position to the middle operating position. A regulating control line 168, shown as a dotted line in FIG. 2, provides a controllable biasing force to the left side of the main pressure regulator 132. The regulating control line 168 delivers a portion of the system pressure to the left side of the main pressure regulator 132 under the control of the line pressure control valve 170.

The line pressure control valve 170 is electrically operated by an electronic control unit (ECU) to set the regulated pressure set point within the hydraulic circuit 110 and then to maintain the desired pressure by regulating the output pressure to the set point. The line pressure control valve 170 supplies a varying portion of the available main pressure through the regulating line 168 to the main pressure regulator 132 by bleeding off some portion of the main pressure that is supplied through the filter 172 to the valve 170. More specifically, the line pressure control valve 170 is schematically illustrated in FIG. 2 and includes a valve body 174, a valve member 176 movably supported by the valve body 174, and a solenoid 178. The solenoid 178 is adapted to move the valve member 176 of the line pressure control valve 170 to produce a flow area through the valve that is a function of the current delivered to the solenoid 178 and to deliver a predetermined amount of pressurized fluid to the left side of the main pressure regulator 132 through a flow restrictor 180 to assist in moving the valve member 160 of the main pressure regulator 132 to the closed position and against the force generated by the cooling fluid acting on the right side of the valve member 160 through the flow restrictor 166. In this manner, the line pressure control valve 170 sets the desired output pressure set point for the main pressure regulator 132. The line pressure control valve 170 then varies the pressure in the regulating control line 168 to maintain the output pressure delivered from the main pressure regulator 132 about the desired output pressure set point while accounting for fluctuations in the output pressure due to downstream pressure changes.

The main pressure regulator 132 also provides control over rapid increases, or surges, in the main pressure line 144 that exceeds the immediate correctability of the line pressure control valve 170. The main regulator valve member 132 opens additional flow passages that not only allow for the continued flow of fluid through the main pressure regulator 132 to the regulated line 156, but also allow a portion of the increased flow to pass to the cooling circuit 116 via cooling fluid line 180 as well as the suction line 182. The suction line 182 normally remains closed off by the main pressure regulator valve member 132. However, when a sharp or rapid increase of pressure in the main pressure line 134 drives the main pressure regulator valve member 160 all the way to the left, a corrective portion of the flow is fed back to the suction side of the first pump 134. As the suction line 182 bleeds off the surge of excessive pressure flow, the main regulator valve member 132 moves back to the middle position.

The regulated line 156 supplies pressurized fluid to the actuation circuit 114. The actuation circuit 114 supplies the first and second clutch actuation valves 118, 120 via filtered line 184 and associated branches 186, 188. Before reaching each of the first and second clutch actuation valves, the fluid is filtered at 190. Each of the first and second clutch actuation valves 118, 120 includes a valve body 192, a valve member 194 movably supported within the valve body 192 and a solenoid 196. The solenoid 196 is adapted to move the valve member 194 to produce a flow area through the clutch actuation valves 118, 120 to deliver a predetermined amount of pressurized fluid to each of the clutches 32, 34 through delivery lines 198, 200, respectively, thereby selectively actuating same. The first and second clutch actuation valves 118, 120 are controlled by the ECU to selectively engage and disengage the respective clutch. A valve return line 202 provides a biasing force through a flow restrictor 204 in a direction opposite to the actuation of the solenoid 196. Similarly, a valve balance line 206 provides additional force through a flow restrictor 208 on the solenoid side of the valve member 194. Each of the first and second clutch actuation valves 118, 120 also includes an output filter 210 and a relief valve 212 downstream of the clutch actuation valves and in advance of the clutches to provide a maximum upper limit for the pressure supplied to actuate the clutches. In their non-operative mode, each of the first and second clutch actuation valves 118, 120 returns any pressurized fluid to the sump 140. As shown in FIG. 2, each of the first and second clutch actuation valves 118, 120 is shown in its non-operative position.

As noted above, the actuator circuit 114 also includes a shift actuation system, generally indicated at 122, that is in fluid communication with the source of pressurized fluid 112 and acts to selectively provide fluid power to the shift actuators 26 so as to actuate the synchronizers 24 and select a designated gear among the plurality of gears. More specifically, the shift actuation system 122 includes first and second multiplex valves 214, 216 as well as first and second actuator regulator valves 218, 220 that are in fluid communication with the source of pressurized fluid 12. The first and second regulator valves 218, 220 include a valve member 221 and operate to direct pressurized fluid to opposite sides of the shift actuators 26. The first and second multiplex valves 214, 216 are operable to select a predetermined pair of adjacent gears among the plurality of gears to which the pressurized fluid is delivered from the first and second actuator regulators 218, 220.

First and second regulator control valves 222, 224 are in fluid communication with the first and second actuator regulator valves 218, 220 through control lines 226, 228, respectively. Thus, the first and second regulator control valves 222, 224 are adapted to selectively control the first and second actuator regulator valves 218, 220. To this end, each of the first and second regulator control valves 222, 224 is in fluid communication with the source of pressurized cooling fluid 112 and includes a valve body 230, a valve member 232 movably supported in the valve body 230, and a solenoid 234. The solenoid 234 is adapted to move the valve member 232 of the associated first and second regulator control valves 222, 224 to produce a control signal pressure to the valve member 221 of the respective one of the first and second actuator regulator valves 218, 220 to move the valve member 221 against the bias of the biasing member 223 to open a respective one of the first and second actuator regulator valves 218, 220. In this way, the first and second actuator regulator valves 218, 220 deliver a controlled, predetermined amount of pressurized fluid through the first and second multiplex valves 214, 216 to move a predetermined shift actuator 26 and an associated synchronizer 24 to select a predetermined gear among the plurality of gears of the dual clutch transmission. In a similar way, each of the first and second multiplex valves 214, 216 is controlled by an on/off solenoid valve 236, 238. In turn, each of the on/off solenoid valves 236, 238 are controlled by the ECU.

As noted above, the cooling circuit 116 includes a lube valve 124 that is in fluid communication with the source of pressurized fluid 112 and adapted to control the flow of pressurized fluid to the clutches of the dual clutch transmission. More specifically, the main pressure regulator 132 is disposed in fluid communication between the pumps 134, 136 and the lube valve 124 via delivery line 240. A cooler limit valve 242 is operatively connected in fluid communication with the lube valve 124 to provide a maximum upper limit for the positive pressure provided through the main pressure regulator 132 to the lube valve 124 via line 240 and branch 244. The lube valve 124 includes a valve body 246 and a valve member 248 movably supported in the valve body 246 to selectively and independently provide a flow of cooling fluid to each of the clutches 32, 34 of the dual clutch transmission through clutch lube line 125. To this end, the lube valve 124 includes a biasing member 247 that acts on the valve member to bias it to a normally closed position.

As noted above, a lube control actuator 126 is in fluid communication with the lube valve 124 and is adapted to selectively control the lube valve. Accordingly, the control actuator 126 is in fluid communication with the source of pressurized cooling fluid 112 through the line 249 via the filter 250. The control actuator 126 includes a valve body 252, a valve member 254 movably supported by the valve body 252 and a solenoid 256. The solenoid 256 is adapted to move the valve member 254 of the lube control actuator 126 to produce a flow area through the control actuator that is a function of the current delivered to the solenoid 256 and to deliver a predetermined amount of pressurized fluid through line 258 (shown as dotted lines) to the right side of the valve member 248 of the lube valve 124 (as illustrated in FIG. 2) through a flow restrictor 260. A feedback line 262 bleeds pressure from the pressurized fluid line 258 and delivers it to the left side of the control actuator 126 as illustrated in FIG. 2 to assist in returning the valve members 254 to its closed positions. In this way, a controlled amount of cooling fluid is provided to the right hand side of the lube valve 124 to move its valve member 248 against the bias of the biasing member 248 to selectively open the lube valve, thereby delivering a controlled, predetermined amount of cooling fluid to the clutches of the dual clutch transmission.

In operation, pressurized cooling fluid is provided to the actuation circuit 114 and the cooling circuit 116 by the first and second pumps 134, 136. When the internal combustion engine of the hybrid vehicle is operable, it drives the first pump 134. Under this operating condition, pressurized fluid is provided to the main pressure regulator 132 via main pressure line 144. The main pressure regulator 132 sets the system pressure in the hydraulic circuit 110. Pressurized fluid is provided to the actuation circuit 114 through the regulated line 156 via the branch 264 taken off the main pressure line 144 at a point schematically illustrated at 266. The pressurized fluid flows through the regulated line 156 to the filtered line 184. The filtered line 184 supplies pressurized fluid to the first and second clutch actuation valves 118, 120 as well as the shift actuation system 122 as described above.

When the internal combustion engine is operable, the first pump 134 also supplies pressurized fluid to the cooling circuit 116. Thus, pressurized fluid flows from the main pressure regulator 132 and into the cooling circuit 116 via cooling fluid line 180. More specifically, pressurized cooling fluid flows through the cooling fluid line 180 to the clutch lube support line 128 as well as the gear lube 130 via branch 268. Branch 268 also supplies pressurized fluid to the lube valve 124 via line 240.

The output of the first pump 134 is a function of the RPM's of the internal combustion engine. Under conditions of low speed, but high heat, the pressure in the cooling circuit 116 may drop below a predetermined value, such as five bars. When the internal combustion engine is operatively driving the first pump 134 and the fluid pressure in the cooling circuit 116 drops below a predetermined value, the hydraulic circuit 110 of the present invention is designed to use the second pump 136 to assist the first pump to provide pressurized fluid to the cooling circuit 116. More specifically, when so commanded, the second pump 136 may be driven by the electric motor 138 (even when the internal combustion engine is operating) to supply pressurized fluid to the cooling circuit 116. Thus, when the pressure in the cooling circuit 116 is below a predetermined value, the first check valve 152 will unseat in response to fluid pressure delivered by the second pump 136. Cooling fluid will then flow through the branch 270 to the lube valve 124 via line 240 via the joint schematically illustrated at 272. Cooling fluid will also flow into the cooler bypass 274 and then to the gear lube line 130 via the joint 272.

When the internal combustion engine is no longer operable, the second pump 136 assumes full responsibility for supplying pressurized fluid to both the actuation circuit 114 and the cooling circuit 116. More specifically, when the first pump 134 is off and the second pump 136 is operable, both first and second check valves 152, 154 will unseat to provide pressurized fluid to the actuation circuit 114 via regulated line 156 and the cooling circuit 116 via branch 270, line 240 and cooler bypass 274. Pressurized cooling fluid will also be supplied from the main pressure regulator 132 to the cooling circuit 116 via line 180 and clutch lube support line 128.

The pressure in the hydraulic circuit 110 is regulated by the main pressure regulator 132. The main pressure regulator 132 is controlled by the pressure control valve 170, which in turn is controlled by the ECU to establish a system pressure. Similarly, first and second clutch actuation valves 118, 120 are controlled by the ECU to selectively provide pressurized fluid to the clutches 32, 34 through delivery lines 198, 200, thereby actuating same. The lube control actuator 126 is similarly controlled by the ECU to provide a predetermined amount of pressurized fluid which acts on the right hand side of the lube valve 124. More specifically, the solenoid 256 of the lube control actuator 126 is adapted to move its valve member 254 to produce a flow area through the lube control actuator 126 that is a function of the current delivered to the solenoid 256 and to deliver a predetermined amount of pressurized fluid through line 258 to the right side of the valve member 248 of the lube valve 124. This in turn controls the actuation of the lube valve 124 to provide a selected, predetermined amount of cooling fluid to each of the clutches 32, 34 of the dual clutch transmission. Similarly, the shift actuation system 122 is controlled by the ECU to provide pressurized fluid delivered via regulated line 156 and filtered line 184 through the first and second actuator regulator valves 218, 220 and first and second multiplex valves 214, 216 to control shifts between the gears of the dual clutch transmission.

Thus, the dual clutch transmission used for a hybrid vehicle of the present invention is configured such that both the first and second pumps 134, 136 may be operable to supply pressurized fluid to the hydraulic circuit when necessary. This may occur, as explained in greater detail above, when the pressure delivered to the cooling circuit 116 drops below a predetermined value. In this case, the second pump 136 driven by the electric motor 138 assists the first pump 134 to provide cooling fluid to the cooling circuit 116 when the first check valve 152 is open. This arrangement allows for the use of a smaller capacity mechanically driven first pump 134 and thereby reduces the cost of the transmission.

It should also be appreciated that other routing arrangements may also be employed without departing from the scope of the present invention.

The invention has been described in an illustrative manner. It is to be understood that the terminology that has been used is intended to be in the nature of words of description rather than of limitation. Many modifications and variations of the invention are possible in light of the above teachings. Therefore, within the scope of the claims, the invention may be practiced other than as specifically described.

We claim:

1. An automatic transmission for a hybrid vehicle having a power plant including an internal combustion engine and an electric motor, said transmission comprising:

a hydraulic circuit (110) having a source of pressurized fluid (112), said hydraulic circuit including an actuation circuit (114) that delivers pressurized fluid used to actuate components of said transmission and a cooling circuit (116) that delivers pressurized fluid used to cool components of said transmission;

said source of pressurized fluid (112) including a first pump (134) operatively driven by the internal combustion engine of the hybrid vehicle and a second pump (136) operatively driven by the electric motor (138), a pair of check valves (152, 154) disposed in series and in fluid communication with said second pump (136);

said first pump (134) operable to supply pressurized fluid to said actuator circuit (114) and said cooling circuit (116) when operatively driven by the internal combustion engine; and said second pump (136) acting to supply pressurized fluid to said cooling circuit (116) when said first pump (134) is operatively driven by said internal combustion engine under certain predetermined conditions and said first check valve (152) is open and further acting to supply pressurized fluid to said actuation circuit (114) and said cooling circuit when said internal combustion engine is no longer operatively driving said first pump (134) and said first and second check valves (152, 154) are open.

2. An automatic transmission for a hybrid vehicle as set forth in claim 1 wherein said transmission includes a pair of clutches (32, 34) operatively interconnecting the power plant to first and second input shafts (14, 16), said actuation circuit (114) including first and second clutch actuation valves (118, 120) in fluid communication with said source of pressurized fluid (112) and a corresponding one of said pair of clutches (32, 34), each of said pair of first and second clutch actuation valves (118, 120) operable to provide pressurized fluid to each of a corresponding one of said pair of clutches to actuate same.

3. An automatic transmission for a hybrid vehicle as set forth in claim 2 further including a plurality of gears operatively supported on said first and second input shafts (14, 16) and adapted to transmit torque at different ratios through said dual clutch transmission, a plurality of synchronizers (24) associated with adjacent pair of gears and a plurality of shift actuators (26) for actuating said synchronizers to select between adjacent gears, said actuator circuit (114) further including a shift actuation system (122) in fluid communication with said source of pressurized fluid (112) and acting to selectively provide fluid power to said shift actuators (26) so as to actuate said synchronizers and select a designated gear among said plurality of gears.

4. An automatic transmission for a hybrid vehicle as set forth in claim 3 wherein said shift actuation system (122) includes a first and second multiplex valves (214, 216) and first and second actuator regulator valves (218, 220) in fluid communication with said source of pressurized fluid, each of said first and second regulator valves (218, 220) includes a valve member (221) that is operable to direct pressurized fluid to opposite sides of said shift actuators (26), said first and second multiplex valves (214, 216) operable to select predetermined pair of adjacent gears among said plurality of gears to which said pressurized fluid is delivered from said first and second actuator regulators (218, 220).

5. An automatic transmission for a hybrid vehicle as set forth in claim 4 further including first and second regulator control valves (222, 224) in fluid communication with said first and second actuator regulator valves (218, 220) and adapted to selectively control said first and second actuator regulator valves, each of said first and second regulator control valves (222, 224) in fluid communication with said source of pressurized fluid (112) and including a valve body (230), a valve member (232) movably supported in said valve body (230), and a solenoid (234), said solenoid adapted to move said valve member (232) of said associated first and second regulator control valves (222, 224) to produce a control signal pressure to said valve member (221) of the respective one of said first and second actuator regulator valves (218, 220) to move said valve member against the bias of said biasing member (223) to open a respective one of said first and second actuator regulator valves (218, 220) thereby delivering a controlled predetermined amount of pressurized fluid through said first and second multiplex valves (214, 216) to move a predetermined shift actuator (26) and an associated synchronizer (24) to select a predetermined gear among the plurality of gears of said dual clutch transmission.

6. An automatic transmission for a hybrid vehicle as set forth in claim 1 wherein said cooling circuit (116) includes a lube valve (124) in fluid communication with said source of pressurized fluid (112) and adapted to control the flow of pressurized fluid to said clutches of said transmission.

7. An automatic transmission for a hybrid vehicle as set forth in claim 6 wherein said lube valve (124) includes a valve body (246) and a valve member (248) movably supported in said valve body (246) to provide a flow of cooling fluid to said clutches of said transmission with said lube valve (124) including a biasing member (247) that acts on the valve member (248) to bias it to a normally closed position.

8. An automatic transmission for a hybrid vehicle as set forth in claim 7 further including a lube control actuator (126) in fluid communication with said lube valve (124) and adapted to selectively control said lube valve (124), said lube control actuator (126) in fluid communication with said source of pressurized fluid (112) and including a valve body (252), a valve member (254) movably supported in said valve body and a solenoid (256), said solenoid adapted to move said valve member (254) of said lube control actuator to produce a control signal pressure to said valve member (248) of said lube valve (124) to move said valve member against the bias of said biasing member (247) to selectively open said lube valve (124) thereby delivering a controlled, predetermined amount of cooling fluid to the clutches of the transmission.

9. An automatic transmission for a hybrid vehicle as set forth in claim 1 wherein said cooling circuit (116) includes a clutch support lube delivery line (128) in fluid communication with said source of pressurized fluid (112) and adapted to provide pressurized cooling fluid to the clutch of the transmission.

10. An automatic transmission for a hybrid vehicle as set forth in claim 1 wherein said cooling circuit (116) includes a gear lube delivery line (130) in fluid communication with said source of pressurized fluid (112) and operable to provide pressurized cooling fluid to the gears of the transmission.

11. An automatic transmission for a hybrid vehicle as set forth in claim 1 further including a main pressure regulator (132) in fluid communication with said source of pressurized fluid (112) and adapted to provide a predetermined set system pressure for said hydraulic circuit (110).

12. An automatic transmission for a hybrid vehicle as set forth in claim 11 wherein said main pressure regulator (132) is disposed in fluid communication between said source of pressurized cooling fluid (112) and said lube valve (124) and said lube control actuator (126).

13. A dual clutch transmission for a hybrid vehicle having a power plant including an internal combustion engine and an electric motor, said dual clutch transmission comprising:
a pair of clutches (32, 34) operatively interconnecting the power plant to first and second input shafts (14, 16);
a hydraulic circuit (110) having a source of pressurized fluid (112);
first and second clutch actuators valves (118, 120) in fluid communication with said source of pressurized fluid (112) and a corresponding one of said pair of clutches (32, 34), each of said pair of first and second clutch actuation valves (118, 120) operable to provide pressurized fluid to each of a corresponding one of said pair of clutches to actuate same;
a lube valve (124) in fluid communication with said source of pressurized fluid (112) and adapted to control the flow of pressurized cooling fluid to components of said dual clutch transmission;
said source of pressurized fluid including a first pump (134) operatively driven by the internal combustion engine of the hybrid vehicle and a second pump (136) operatively driven by the electric motor (138), a pair of check valves (152, 154) disposed in series and in fluid communication with said second pump (136);
said first pump (134) operable to supply said hydraulic circuit (110) with pressurized fluid when said internal combustion engine is operating; and
said second pump (136) acting to supply pressurized fluid when said internal combustion engine and said electric motor (138) are operable and said first check valve (152) is open and further acting to supply pressurized fluid to said first and second clutch actuators (118, 120) when said first and second check valves (152, 154) are open and said electric motor (138) is operable.

14. A dual clutch transmission for a hybrid vehicle as set forth in claim 13 wherein said lube valve (124) including a valve body (246) and a valve member (248) movably supported in said valve body to provide a flow of cooling fluid to each of the pair of clutches (32, 34) of the dual clutch transmission with said lube valve (124) including a biasing member (247) that acts on the valve member (248) to bias it to a normally closed position.

15. A dual clutch transmission for a hybrid vehicle as set forth in claim 14 further including a lube control actuator (126) in fluid communication with said lube valve (124) and adapted to selectively control said lube valve, said lube control actuator (126) in fluid communication with said source of pressurized fluid (112) and including a valve body (252), a valve member (254) movably supported in said valve body and a solenoid (256), said solenoid adapted to move said valve member (254) of said lube control actuator (126) to produce a control signal pressure to said valve member (248) of said lube valve (124) to move said valve member against the bias of said biasing member (247) to selectively open said lube valve (124) thereby delivering a controlled, predetermined amount of cooling fluid to the clutches (32, 34) of the dual clutch transmission.

16. A dual clutch transmission for a hybrid vehicle as set forth in claim 13 wherein said dual clutch transmission further includes a plurality of gears operatively supported on said first and second input shafts (14, 16) and adapted to transmit torque at different ratios through said dual clutch transmission, a plurality of synchronizers (24) associated with adjacent pair of gears and a plurality of shift actuators (26) for actuating said synchronizers (24) to select between adjacent gears, said hydraulic circuit (110) further including a shift actuation system (122) in fluid communication with said source of pressurized fluid (112) and acting to selectively provide fluid power to said shift actuators (26) so as to actuate said synchronizers (24) and select a designated gear among said plurality of gears.

17. A dual clutch transmission for a hybrid vehicle as set forth in claim 16 wherein said shift actuation system (122) includes first and second multiplex valves (214, 216) and first and second actuator regulator valves (218, 220) in fluid communication with said source of pressurized fluid (112), said first and second regulator valves (218, 220) operable to direct pressurized fluid to opposite sides of said shift actuators (26), said first and second multiplex valves (214, 216) operable to select predetermined pair of adjacent gears among said plurality of gears to which said pressurized fluid is delivered from said first and second actuator regulators (218, 220).

18. A dual clutch transmission for a hybrid vehicle as set forth in claim 17 further including first and second regulator control valves (222, 224) in fluid communication with said first and second actuator regulator valves (218, 220) and adapted to selectively control said first and second actuator regulator valve, each of said first and second regulator control valves (222, 224) in fluid communication with said source of pressurized fluid (112) and including a valve body (230), a valve member (232) movably supported in said valve body, and a solenoid (234), said solenoid adapted to move said valve member (232) of said associated first and second regulator control valves (222, 224) to produce a control signal pressure to said valve member (221) of the respective one of said first and second actuator regulator valves (218, 220) to move said valve member (221) against the bias of said biasing member (223) to open a respective one of said first and second actuator regulator valves (218, 220) thereby delivering a controlled predetermined amount of pressurized fluid through said first and second multiplex valves (214, 216) to move a predetermined shift actuator (26) and an associated synchronizer (24) to select a predetermined gear among the plurality of gears of said dual clutch transmission.

19. A dual clutch transmission for a hybrid vehicle as set forth in claim 13 further including a main pressure regulator (132) in fluid communication with said source of pressurized fluid (112) and adapted to provide a predetermined set system pressure for said hydraulic circuit.

\* \* \* \* \*